INVENTOR
John C. Evans

INVENTOR
John C. Evans
BY
ATTORNEY

Patented Jan. 25, 1944

2,339,987

UNITED STATES PATENT OFFICE 2,339,987

VENTILATING SYSTEM

John C. Evans, New York, N. Y.

Application March 4, 1941, Serial No. 381,620

5 Claims. (Cl. 98—49)

This invention relates to a ventilating system, more particularly to a system of ventilating tunnels, where it is desirable to detect the presence of impurities in the air. The invention will therefor be described in that connection, although it will be understood that it is applicable wherever it is desirable to indicate or measure continuously the opacity of a gas.

In the ventilation of tunnels, particularly of vehicular tunnels at the present time, one of the factors to be considered is visibility for drivers within the tunnel. This may be adversely affected by the degree of mist or fog or other things within the tunnel. This may arise in part from the discharge of the motor cars, particularly when operated by Diesel engines, or it may arise from the moisture content or impurities carried by the incoming air, which may be in the form of a mist or which may be condensed into mist by the lower temperature within the tunnel.

It is an object of this invention to provide a system by which the quantity of incoming air may be regulated by the measure of visibility within the tunnel. It is a further object to provide a system by which the quantity of incoming air may be regulated so as to prevent accumulation in the air of any substances from the motor cars to cause opacity. This may be done by increasing the inflow of fresh air, but the system should not operate to increase the inflow of fresh air under conditions where the fresh air itself is carrying the moisture or impurities which prove objectionable, as for example, where the outside air itself is so heavily laden with moisture as to produce fog in the tunnel.

The presence of moisture in the air presents no serious danger except to the extent that the moisture is precipitated into mist to the point of interfering with the vision of the driver.

Former attempts to measure the degree of opacity by means of a source of light and a photoelectric cell have met with a serious limitation because the actual amount of light absorbed by the atmosphere is not very great even when it exists to the degree of reducing the visibility below the danger point. With such a system, therefore, a slight variation in the intensity of the source of light, for example, the variation in voltage of an incandescent light will completely mask the relatively, much smaller change due to the absorption of light by the atmosphere.

There are a number of other changes which also may mask the measurement of the opacity, such for example, as the accumulation of dirt upon the light, upon the condensing lenses, or upon the photocell. Such a system, therefore, would be apt to regulate the ventilation in accordance with the sum of these external factors rather than by the absorption of light by the atmosphere.

It will be clear that this system is adapted for use with any form of control apparatus, whether it be in the form of signal apparatus to warn the attendant of the need of change, or of a recording apparatus to give the executives a record of conditions. The control apparatus may also take the form of actually controlling the ventilation automatically.

Where a light responsive device is utilized to measure the degree of opacity within the tunnel, it will normally respond to momentary changes in that opacity, too temporary to be taken into account in altering the ventilating system. If, therefore, it should be desirable to utilize the system for the automatic regulation of the ventilation, I prefer to provide some sort of delaying means or integrating means, such as will respond to the average condition over small periods of time, rather than to the instantaneous values. Thus, in accordance with this disclosure, there is provided a delayed action relay which will not respond to increases of opacity until they have lasted a sufficient number of seconds or minutes to indicate that the condition is not an instantaneous one.

This invention accordingly comprises a system, possessing the features, properties and the relation of elements which will be exemplified in the system hereinafter described and the scope of the application of which will be indicated in the claims.

For a fuller understanding of the nature and objects of the invention, reference should be had to the following detailed description taken in connection with the accompanying drawings, in which.

Figure 1:
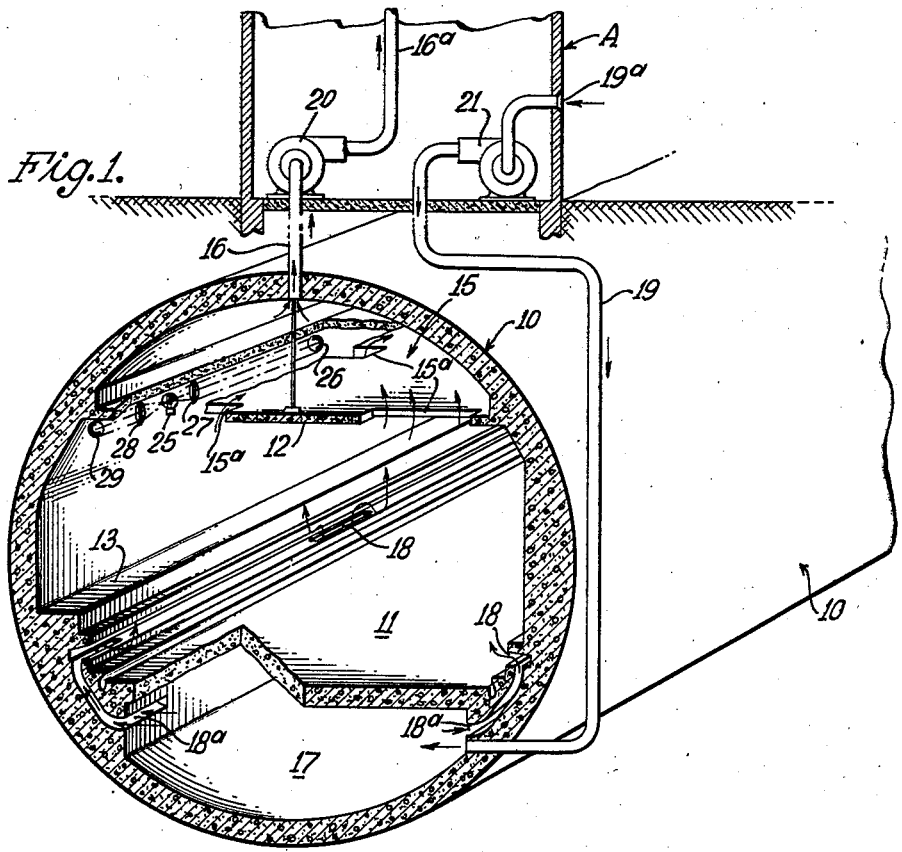
Fig. 1 is a sectional view of a tunnel showing the body of the tunnel in perspective, embodying this invention.
Figure 2:
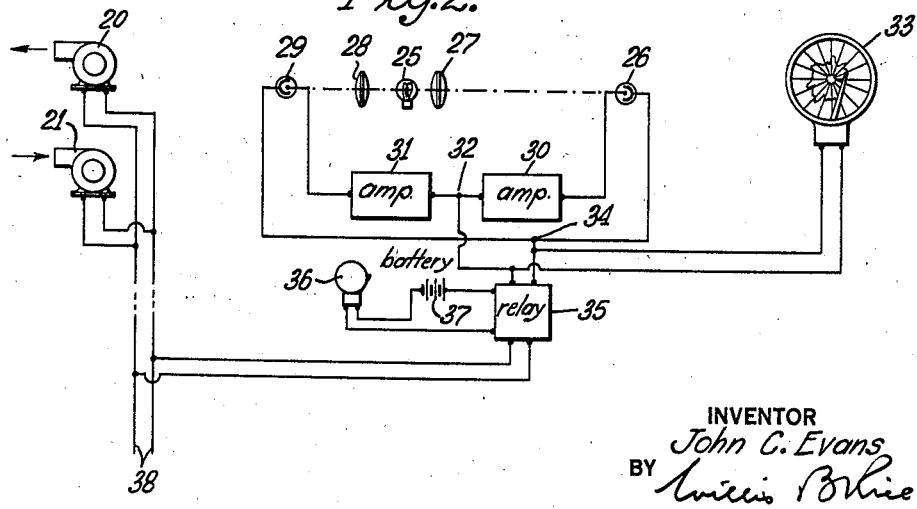
Fig. 2 is a diagram showing the circuit connections for indicating and registering the degree of opacity, or controlling the ventilating system, by that opacity, as may be desired.

This invention will have many uses independent of any particular ventilating system, but I have chosen for illustration, a somewhat simplified, but nevertheless, typical installation, for the ventilation of a vehicular tunnel.

In the drawings the numeral 10 represents diagrammatically a tunnel wall having a roadway 11, a ceiling 12 and a patrolman's walk 13, raised above the roadway 11. The roadway 11 and the ceiling 12, comprising as they do, chords of the tunnel cross section, form below and above them, longitudinal ducts which are the main ventilating ducts of the system. As shown, both ceiling and roadway are broken away in part, to show the construction of the other part.

For example, above the ceiling, there is thus provided a ventilating duct 15 extending the length of the tunnel; and below the roadway 11, there is provided a second duct 17 which also extends the length of the tunnel. At some point, there is provided above the tunnel, a ventilating shaft A, and the duct 15 communicates with this ventilating shaft, by an outlet 16, and preferably discharges through the top of the shaft, 16a; while the fresh air is drawn through the ventilating shaft, preferably through the side walls thereof at 19a, and admitted to the fresh air duct 17, by a conduit 19. Blowers 20 and 21 are arranged respectively in the exhaust and intake conduits, to force the movement of air therethrough. The fresh air is discharged laterally across the tunnel through outlets 18, which communicate with the fresh air duct through conduits 18a at spaced intervals along the length of the tunnel. The air from the top of the tunnel passes into the exhaust air duct 15 through openings 15a in the ceiling, which are also arranged at spaced intervals throughout the tunnel.

The foregoing describes a typical ventilating system with which this invention is adapted to be used.

In accordance with this invention, there is provided in the tunnel, in the upper part of the vehicular portion thereof, but preferably below the ceiling, a source of radiant energy, which is herein illustrated, as comprising an electric lamp 25, and spaced a material distance from the lamp 25, in the direction of the extension of the tunnel is a light sensitive cell 26, which is situated in the path of a beam of light issuing from the lamp 25. Preferably, in order to concentrate the maximum amount of light upon the light sensitive cell 26, and thus permit the light sensitive cell to be placed a material distance away from the light, I prefer to add a condenser, as shown in the form of a condensing lens 27, so constructed and so spaced as to produce a substantially parallel beam of light to impinge upon the light sensitive cell.

In order to cause the device to be especially responsive to fog conditions, the source of radiant energy 48 is preferably designed to give off short wave energy in the violet or ultra-violet field. Energy of these wave lengths is active upon a photocell, but is absorbed by fog far more than the longer wave lengths. Thus the system can be made more selective in response to fog conditions as compared to other factors which might influence it.

In the drawings herein, for convenience of illustration only, the distance between the light sensitive cell and the electric lamp is shortened, but in reality, in most instances it will be desirable to have this distance very considerable, in order that the absorption of light, by opacity of the atmosphere, may be most easily indicated. At the same time, since, ordinarily, tunnels slant upwardly from the middle toward each end, this construction makes it possible to have the location of the light, be at precisely the point where the long range vision of the driver pierces the tunnel, since, if he is looking at a distance ahead, the straight line of vision will come close to the ceiling of the tunnel.

In the embodiment shown in Fig. 1, the second condenser 28 is arranged to condense another portion of the light from the lamp upon a second light sensitive cell 29, which is so situated with regard to the lamp, that the light absorbed in passing from the lamp to the light sensitive cell, is very much less than the light absorbed between the lamp 25, and the light sensitive cell 26. This can be readily accomplished by placing the light sensitive cell 29 much nearer to the light 25 than the light sensitive cell 26, and focusing the condenser 28 accordingly.

The circuits from these light sensitive cells are connected to the control apparatus, in opposed relation to each other, so that the control apparatus is affected by the difference between the response of the two cells. Ordinarily, since the output of the cells is quite small, it would be desirable to place an amplifying device in the circuit of either one or both of the cells. In some cases, however, it may be preferred to connect the cells together, in opposed relationship, and to place the amplifier in the circuit, leading out of the connection between them, so that only the difference in power of the two cells is amplified.

As shown, amplifiers 30 and 31 are connected into the circuits of cells 26 and 29 respectively and are connected together at point 32.

The control apparatus may include a recording meter 33, connected across between the point 32 and the other side 34 of the cells. Thus, the meter will indicate the instantaneous amount of difference between the cells, and indicate the amount of opacity in the tunnel.

There may be also connected to the points 32 and 34, the primary of a relay 35, having contacts to operate a signal, such as a bell 36, connected in series with a battery 37.

The relay 35 may also have contacts to connect the fans 20 and 21, to the power wires 38. In order to prevent the fans from going on and off with each momentary fluctuation of the opacity, as, for example, caused by a passing car, means are provided to cause the fans to operate only after a given change in opacity, has endured for a predetermined length of time. This may be conveniently accomplished by making the relay 35, of the delayed action type, in which the operation of the relay occurs only when the operating power has been applied for a predetermined time. Such relays are known, and their detail forms no part of this invention. It will be readily apparent that the recording meter 33, may be also connected through some sort of dampening or delaying mechanism, so as to limit instantaneous fluctuations of the needle, and cause the needle to respond only to the more general trends.

Figure 3:
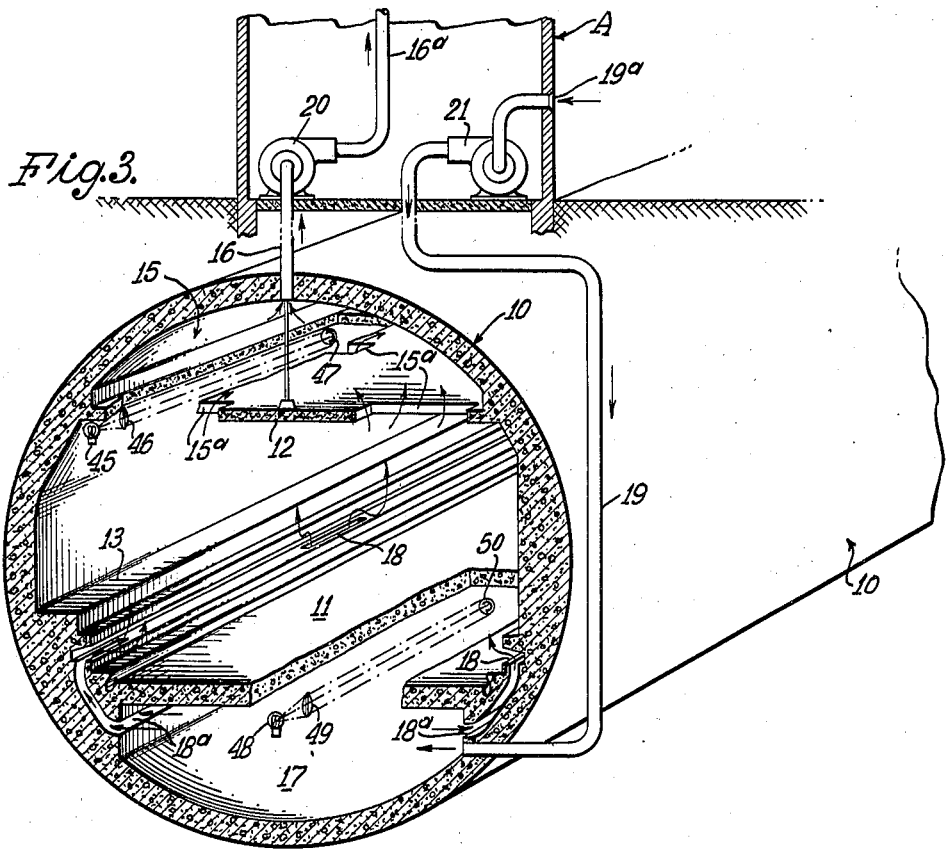
Fig. 3 shows a cross section of the tunnel with the tunnel given in perspective to show a modification of the device.
Figure 4:
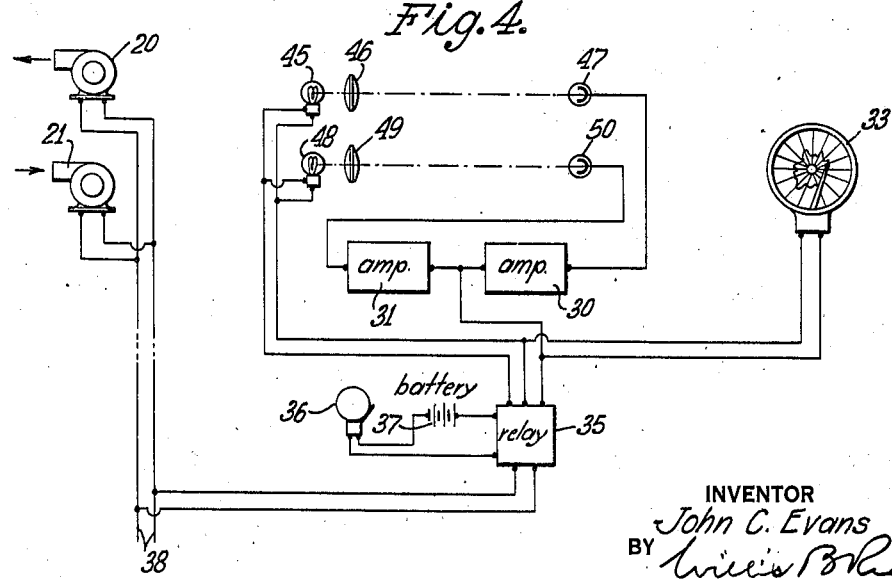
Fig. 4 is a wiring diagram of the modification.

The principle herein referred to makes it possible to control the ventilating system, by means of the difference between the opacity of the incoming air and of the air in the tunnel proper. Such a system is illustrated in Figs. 3 and 4, in which embodiment there is provided a source of radiant energy, such as an electric lamp 45 and a condenser 46, directing light upon a light sensitive cell 47, positioned to be responsive to the condition of the air between them, in the upper portion of the tunnel, just as described in the previous modification.

In this embodiment, however, the comparison light sensitive cell is placed in the intake duct 17. Thus, as shown, there is provided a source of radiant energy, in the form of an electric lamp 48, having a condenser 49, disposed to direct the light upon a light sensitive cell 50, the parts being disposed in the intake duct. Here again, the light sensitive cell and the source of light will be spaced from each other, a distance along the length of the tunnel, so as to be responsive to the ease with which the air in the intake transmits the light. The actual distance between the elements will be much greater than that shown in the drawings, which is shortened for convenience of illustration.

I prefer that the two light sensitive cells shall be spaced the same distance from their light sources, so as to balance out all factors possible, except the difference in opacity in the intake duct and in the tunnel. The two sources of radiant energy shown as the two lights 45 and 48 are preferably arranged in multiple, across the same power lines, so that any fluctuations in light, caused by variations in the power, will affect the two lamps equally, thus balancing out their effect upon the control apparatus, because of the reverse manner in which the light sensitive cells are connected. In some cases, I may prefer carefully to balance the electric lamps against each other at varying voltage, and also to balance the light sensitive cells, but for many purposes, this precaution is not necessary, and the degree of sensitiveness required for commercial operation, may be obtained without this precaution.

The circuits from the light sensitive cells 47 and 50 are, as in the previous modification, connected together with the circuits, in opposition, to operate the recording meter, the signal bell, or to start and stop the fans.

Since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which as a matter of language might be said to fall therebetween.

What is claimed is:

1. A ventilating device of the type having means to cause the flow of air into and out of the enclosure, said device comprising, means to produce two separate beams of light actuated by a single source of power, a pair of light sensitive devices, one situated in each of said beams, one of said light sensitive devices being so situated that the beam of light will traverse a materially greater distance of the air within the enclosure before reaching the light sensitive device than the second beam, control apparatus for controlling the flow of air, means for connecting said light sensitive devices in opposition to each other to said control apparatus for controlling the said flow of air, whereby the control apparatus is caused to respond differentially to said light sensitive devices substantially independent of fluctuation in the source of power.

2. A device according to claim 1 in which the source of light is adapted to give off short wave light only whereby the device responds especially to fog.

3. A ventilating device of the type having means to cause the flow of air into and out of the enclosure, said device comprising, means to produce two separate beams of light actuated by a single source of power, a pair of light sensitive devices, one situated in each of said beams, one of said light sensitive devices being situated in the path of air within the enclosure, and the other being situated in the path of air entering the enclosure, control apparatus for controlling the flow of air, means for connecting said light sensitive devices in opposition to each other to said control apparatus for controlling the said flow of air, whereby the control apparatus is caused to respond differentially to said light sensitive devices substantially independent of fluctuation in the source of power.

4. A device in accordance with claim 3 in which the light producing means is constructed to emit short wave light only.

5. A device in accordance with claim 1, in which said control apparatus includes means for delaying the control of the flow of air until a predetermined period after actuation of the control apparatus by the light sensitive device.

JOHN C. EVANS.